(12) United States Patent
Arai

(10) Patent No.: US 6,827,316 B1
(45) Date of Patent: Dec. 7, 2004

(54) CLAMP

(75) Inventor: Hiroaki Arai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/479,609

(22) PCT Filed: Jun. 6, 2002

(86) PCT No.: PCT/JP02/05621

§ 371 (c)(1),
(2), (4) Date: Dec. 6, 2003

(87) PCT Pub. No.: WO02/100686

PCT Pub. Date: Dec. 19, 2002

(30) Foreign Application Priority Data

Jun. 6, 2001 (JP) ........................................ 2001-171579

(51) Int. Cl.[7] .............................. F16L 3/22; F16L 33/00
(52) U.S. Cl. ...................... 248/68.1; 24/16 PB; 248/71; 248/73
(58) Field of Search ................................ 248/68.1, 74.1, 248/71, 73, 74.3; 174/135, 138 D; 411/182; 24/16 PB

(56) References Cited

U.S. PATENT DOCUMENTS

| 4,495,380 | A | * | 1/1985 | Ryan et al. | ............. 174/138 D |
| 4,505,006 | A | * | 3/1985 | Andre | ...................... 24/16 PB |
| 4,700,913 | A | * | 10/1987 | Hirano et al. | .................. 248/73 |
| 5,314,280 | A | * | 5/1994 | Gagliardi et al. | ........... 411/182 |
| 5,759,004 | A | * | 6/1998 | Kuffel | ......................... 411/508 |
| 5,774,949 | A | * | 7/1998 | Cornell et al. | ................. 24/293 |
| 6,320,134 | B1 | * | 11/2001 | Rehberg et al. | ............. 174/135 |
| 6,398,169 | B1 | * | 6/2002 | Streit | .......................... 248/71 |
| 6,464,181 | B2 | * | 10/2002 | Sakakura | .................... 248/68.1 |

FOREIGN PATENT DOCUMENTS

| DE | 195 39 496 |   | 4/1997 |
| EP | 0967 702 A2 | | 12/1999 |
| GB | 2243399 | * | 10/1991 |

* cited by examiner

Primary Examiner—Leslie A. Brown
Assistant Examiner—Tan Le
(74) Attorney, Agent, or Firm—Finnegan, Henderson, Farabow, Garrett & Dunner, L.L.P.

(57) ABSTRACT

A clamp 21 includes a mount portion 23 mounted to an electric wire 3, and a retaining portion 25 for retaining the mount portion 23 to a mating mount portion 7. The retaining portion 25 is formed on a column 33 having a base end side 39 connected to the mount portion 23 through a rupture portion 31 which can be ruptured, and an engaging blade portion 35 provided on a tip end of the column 33 for engaging with the engaging hole 13 of the mating mount portion 7. The rupture portion 31 is provided along a circumferential direction of the column 33.

8 Claims, 4 Drawing Sheets

CLAMP

TECHNICAL FIELD

The present invention relates to a clamp for fixing a predetermined position of an electric wire which is wired in a vehicle or the like and for neatening a wiring attitude of the electric wire.

BACKGROUND ART

FIG. 1 shows a proposed clamp A clamp 1 includes a mount portion 5 mounted to a wire harness 3 comprising a plurality of electric wires, and a retaining portion 9 which is provided on a lower surface of the mount portion 5 for retaining the mount portion 5 to a panel 7 of a vehicle or the like which is a mating mount portion.

The retaining portion 9 includes a column 11 projecting from the mount portion 5, and a pair of engaging blade portions 15 and 15 connected to the column 11 and engaged with a engaging hole 13 of the panel 7. Each of the engaging blade portions 15 and 15 are inclined so that the engaging blade portion 15 gradually spreads outward from a tip end of the column 11 toward the mount portion 5, and the engaging blade portion 15 has resilience. The engaging blade portion 15 is provided at its tip end with an engaging step portion 17 to be engaged with an opening edge of the engaging bole 13 of the panel 7.

In the clamp 1, the mount portion 5 is prior-mounted to a predetermined position of the wire harness 3 by a tape winder 19. Then, the engaging blade portions 15 are pushed into the engaging hole 13. The engaging step portions 17 are engaged with opening edges of the engaging bole 13. In this state, the engaging step portions 17 are biased outward by resilient forces of the engaging blade portions 15 and 15, and an engaged state with respect to the engaging hole 13 is held. As a result, the predetermined position of the wire harness 3 is fixed to the panel 7 by the clamp 1 in a state in which the wire harness 3 is wired in a vehicle or the like.

In the clamp 1, when the wire harness 3 is removed from the panel 7 at the time of separated dumping or the recycling of vehicle or the like, engaging blade portion 15 of the clamp 1 is forcibly bent against its resilient force, thereby releasing the engagement between the engaging step portion 17 and the engaging hole 13 of the panel 7. The mount portion 5 is separated from the panel 7 in this state, thereby removing the wire harness 3 from the panel 7.

However, in this clamp 1, the rigidity of the engaging blade portion 15 is set high so that the engaged state between the engaging step portion 17 and the engaging hole 13 is not released by inadvertent force. Therefore, it is difficult to forcibly bend the engaging blade portion 15 against its resilient force. Thus, it takes time and labor to remove the wire harness 3 from the panel 7.

DISCLOSURE OF THE INVENTION

The present invention has been accomplished to solve the above problem and it is an object of the present invention to provide a clamp capable of easily removing an electric wire from a mating mount portion.

The first aspect of the present invention provides a clamp, comprising: a mount portion to be mounted to an electric wire; and a retaining portion for retaining the mount portion to a mating mount portion, the retaining portion, comprising: a rupture portion which can be ruptured; a column having a base end side connected to the mount portion through the rupture portion; and an engaging blade portion provided on a tip end of the column and engaged with an opening of the mating mount portion, wherein the rupture portion is provided along a circumferential direction of the column.

According to the first aspect, a mount portion is mounted to a predetermined position of an electric wire, engaging blade portions are engaged with engaging holes, the mount portion is retained to a mating mount portion, and the electric wire is fixed to the mating mount portion. If a rupture portion is ruptured in a state in which the electric wire is fixed to the mating mount portion, the fixed state of the electric wire to the mating mount portion can be released.

Since the rupture portion is provided on the column in the circumferential direction, when inadvertent force is applied to the electric wire in a state in which the electric wire is fixed to the mating mount portion, the inadvertent force is dispersed to the entire region of the rupture portion, and it is possible to prevent the rupture portion from being ruptured.

The second aspect of the present invention provides the clamp according to the first aspect of the present invention, wherein the rupture portion is formed by a plurality of thin portions, having predetermined pitches from one another.

According to the second aspect, the rupture portion of the column is formed by a plurality of thin portions provided along the circumferential direction. Therefore, it is possible to rupture the rupture portion more easily in a state in which the electric wire is fixed to the mating mount portion.

The third aspect of the present invention provides the clamp according to the first aspect of the present invention, wherein the base end side of the column is formed into a columnar shape.

According to the third aspect, the base end side of the column is formed into a columnar shape. Therefore, it is possible to more reliably disperse the inadvertent force applied to the electric wire in the fixed state of the electric wire to the mating mount portion.

The fourth aspect of the present invention provides the clamp according to the first aspect of the present invention, further comprising; an abutting portion provided on the column, wherein the abutting portion abuts against the mating mount portion in a state in which the mount portion is engaged with the mating mount portion.

According to the fourth aspect, the abutting portion is abutted against the mating mount portion in addition to the engagement of the engaging blade portion with the engaging hole in the state in which the electric wire is fixed to the mating mount portion. Therefore, the retaining portion is retained to the mating mount portion reliably.

The fifth aspect of the present invention provides the clamp according to the fourth aspect of the present invention, wherein the abutting portion is formed by an annular plate member, and projected outward in the circumferential direction of the column.

According to the fifth aspect, the abutting portion is formed into the annular plate member and thus, the inadvertent force applied to the column can be dispersed more reliably in a state in which the electric wire is fixed to the mating mount portion.

The sixth aspect of the present invention provides the clamp according to the first aspect of the present invention, further comprising; a projecting portion provided at end of the mounting portion in longitudinal direction.

According to the sixth aspect, the end of the mount portion in the longitudinal direction is provided with the projecting portion. With this, when the electric wire is removed from the mating connector, if the mount portion is turned around the projecting portion, the rupture portion can be ruptured easily.

The seventh aspect of the present invention provides the clamp according to the first aspect of the present invention, further comprising; a through hole provided on the mount portion, wherein the base end side is accommodated in the through hole.

According to the seventh aspect, since the base end side of the column is accommodated in the through hole of the mount portion, the clamp can be reduced in size correspondingly.

The eighth aspect of the present invention provides the clamp according to the first aspect of the present invention, further comprising; an engaging step portion provided at a tip end of the engaging blade portion, wherein the engaging step is engaged with an opening edge of the opening.

According to the eighth aspect, since the engaging step portion which engages with the opening edge is provided, the engaging blade portion is engaged with the opening reliably.

BEST MODE FOR CARRYING OUT THE INVENTION

Figure 1:
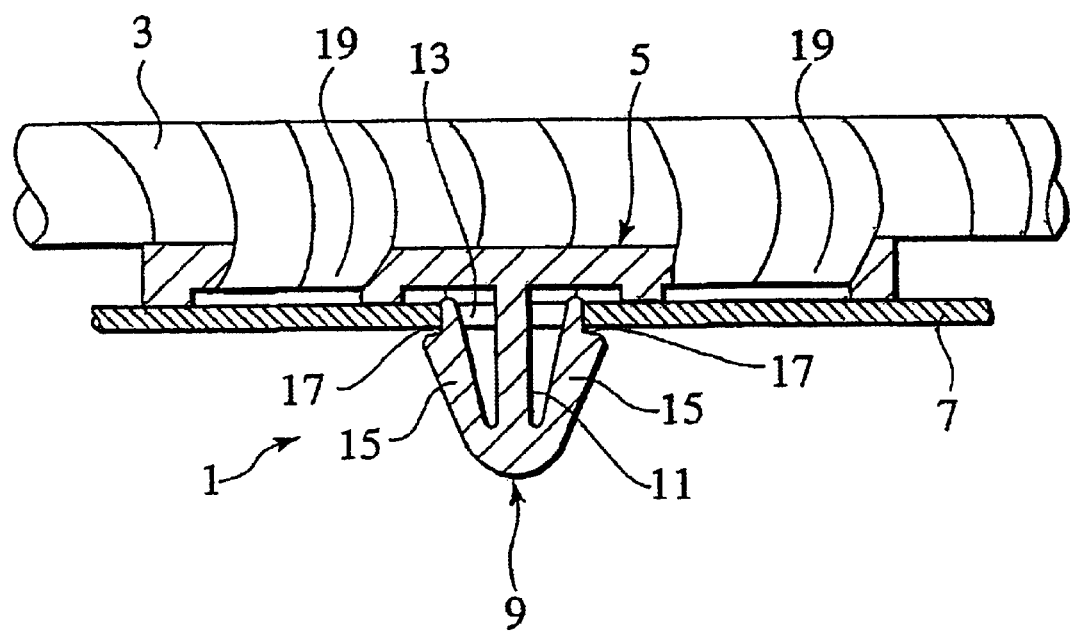
FIG. 1 is a sectional view showing a proposed clamp.

Embodiments of the present invention will be explained below with reference to the drawings, wherein like numbers are designated by like reference characters.

Figure 2A:
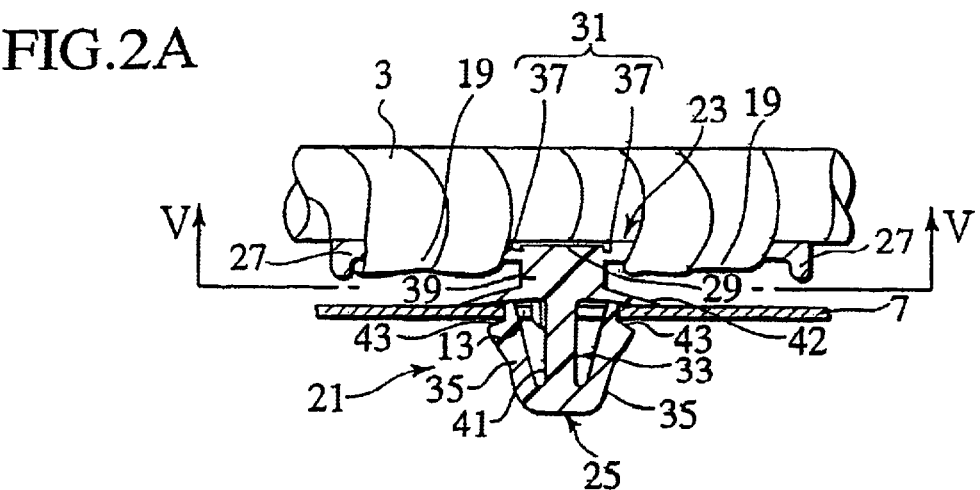
FIG. 2A is a sectional view of a state in which a wire harness is mounted to a panel in the clamp of an embodiment of the present invention.
Figure 2B:
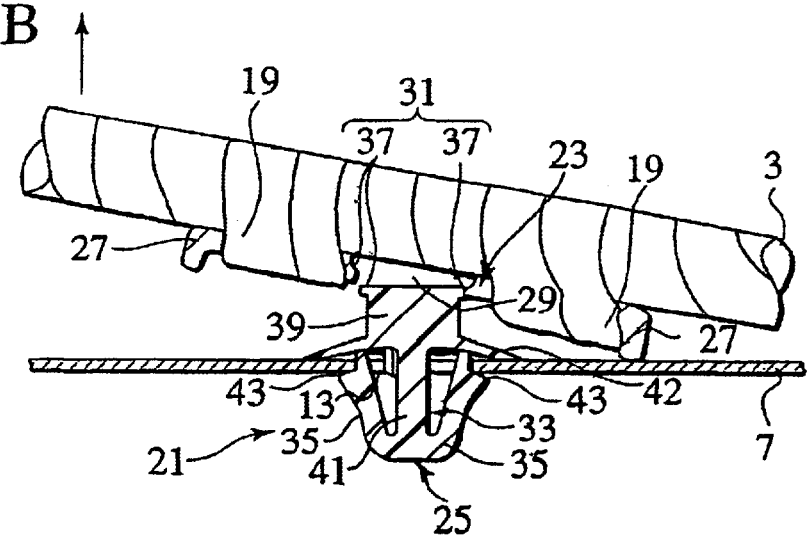
FIG. 2B is a sectional view of a state in which the wire harness is removed from the panel in the clamp of the embodiment of the present invention.
Figure 2C:
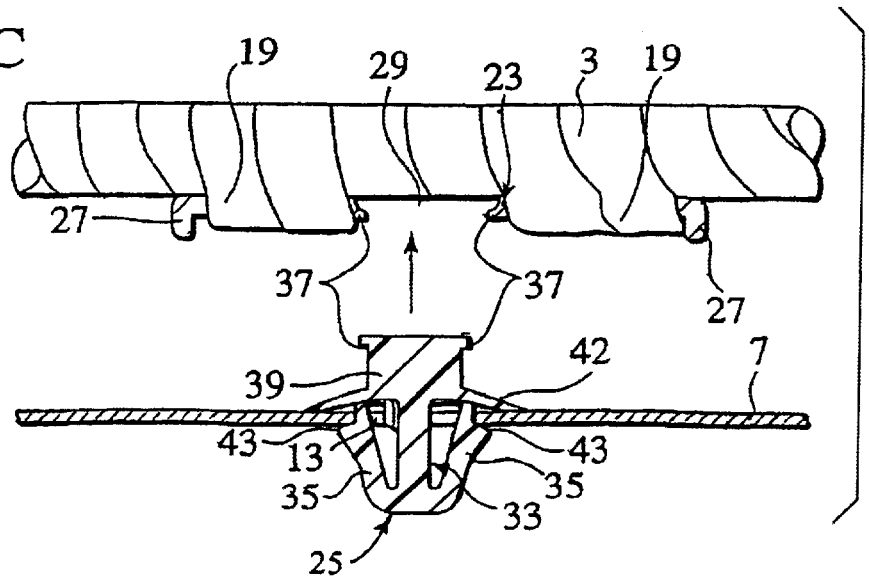
FIG. 2C is a sectional view of a state in which the wire harness was removed from the panel in the clamp of the embodiment of the present invention.
Figure 3:
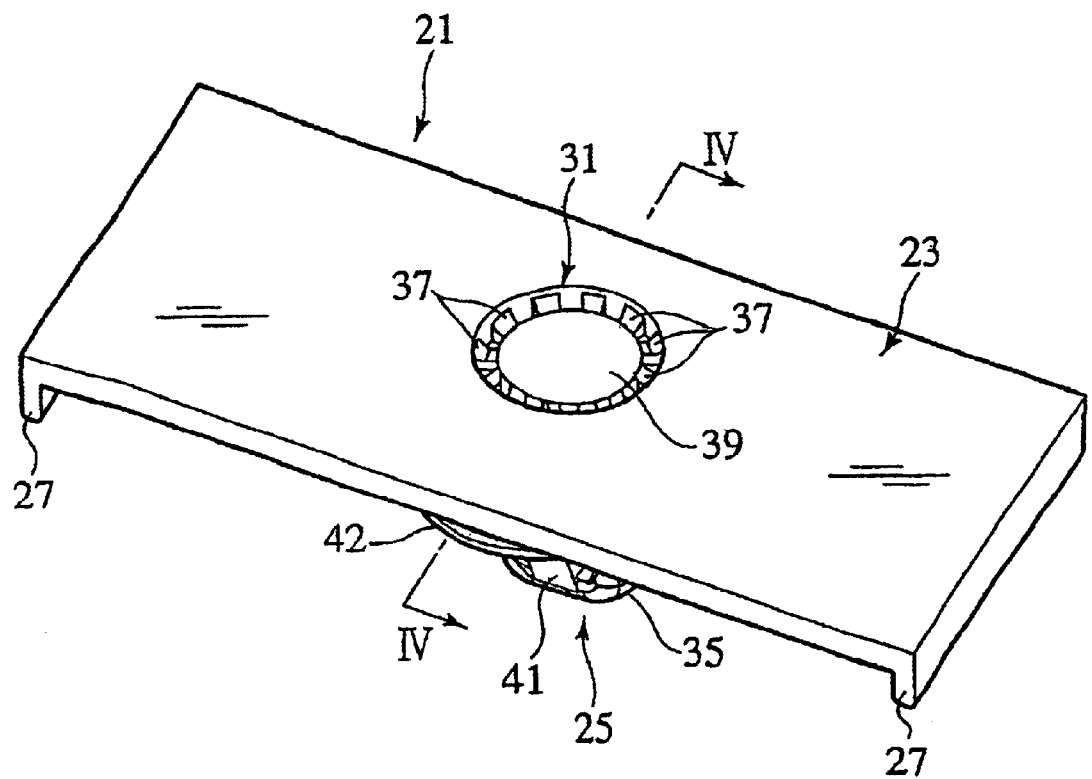
FIG. 3 is a perspective view of the clamp in the embodiment of the invention shown in FIGS. 2A, B and C.
Figure 4:
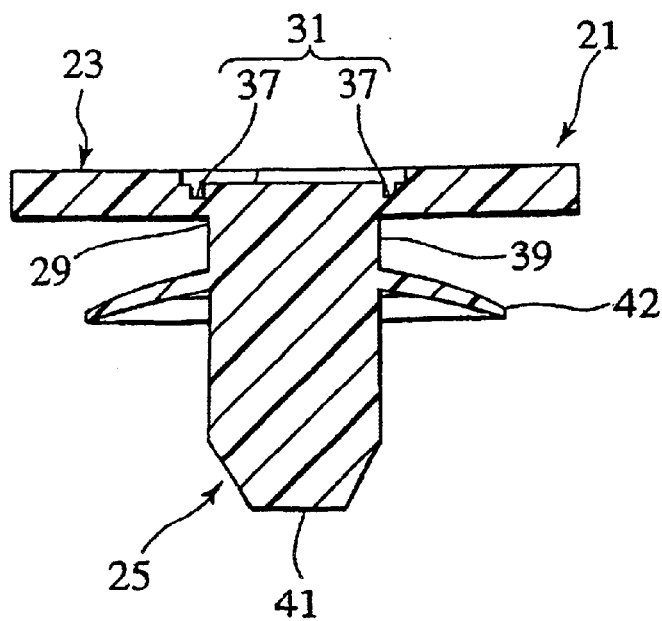
FIG. 4 is a sectional view of the clamp of the embodiment of the invention, which is taken along a line IV—IV in FIG. 3.
Figure 5:
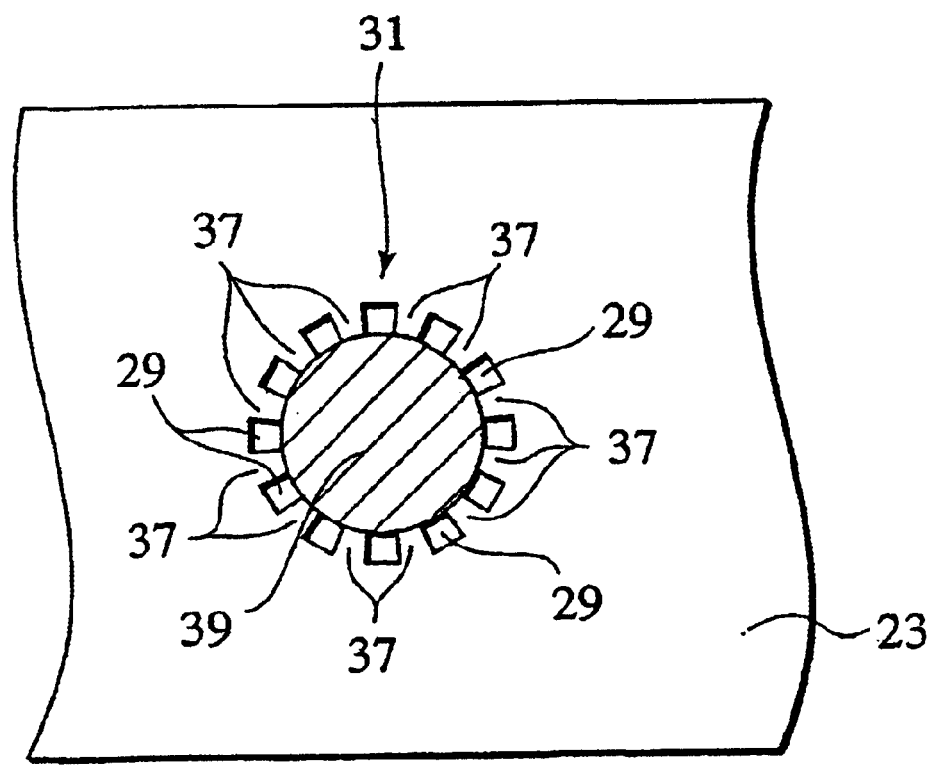
FIG. 5 is sectional view of the clamp of the embodiment of the invention, which is taken along a line V—V in FIG. 2A.

FIGS. 2A to 2C are explanatory views of operation from a state in which a wire harness is mounted to a panel to a state in which the wire harness is removed from the panel according to a first embodiment of a clamp of the present invention. FIG. 3 is a perspective view of the clamp shown in FIGS. 2A to 2C. FIG. 4 is a sectional view of the clamp, which is taken along a line IV—IV in FIG. 3. FIG. 5 is a sectional view of the clamp, which is taken along a line V—V in FIG. 2A.

As shown in FIGS. 2 to 5, a clamp 21 of the embodiment comprises an integrally molded product made of synthetic resin. The clamp 21 includes a mount portion 23 mounted to a wire harness 3 comprising a plurality of electric wires, and a retaining portion 25 for retaining a mount portion 23 to a panel 7 of a vehicle or the like which is a mating mount portion.

The mount portion 23 is formed into a rectangular shape, and has protecting portions 27 which project in a widthwise direction from opposite sides of a lower surface of the mount portion 23. The mount portion 23 is provided at its central portion with a through hole 29, having substantially circular opening, passing through the mount portion 23 from an upper surface thereof to a lower surface thereof.

The retaining portion 25 comprises a column 33, and an engaging blade portion 35, which engages with the engaging hole 13 of the panel 7, mounted on a tip end of a lower portion 41 which is a tip end of the column 33. In the column 33, an upper portion 39 which is a base end side of the column 33 is connected to the mount portion 23 through a flexible rupture portion 31 which can be ruptured.

The rupture portion 31 comprises a plurality of thin portions 37 provided around an inner peripheral surface of the through hole 29 along the circumferential direction. A predetermined pitch is set between adjacent thin portions 37, and the plurality of thin portions 37 project from the inner peripheral surface of the through hole 29 toward the upper portion 39. Each of the thin portions 37 is formed into a thin plate-like shape whose thickness is set smaller than that of the mount portion 23, and the thin portion 37 has flexibility. An upper surface of the thin portion 37 is formed into a recessed shape between the tip end and a base end of the mount portion 23, and a lower surface of the thin portion 37 is substantially flush with the lower surface of the mount portion 23. The thin portion 37 is ruptured if it is pulled between the through the hole 29 of the mount portion 23 and a later-described column 33.

The column 33 which is connected to the mount portion 23 through the rupture portion 31 is disposed in a vertical direction. The upper portion 39 is formed into a columnar shape having a diameter smaller than that of the through hole 29 of the mount portion 23. The upper portion 39 projects outward with respect to an outer peripheral surface of the lower portion 41. The upper portion 39 of the column 33 is accommodated in the through hole 29 of the mount portion 23, and an upper surface of the upper portion 39 is disposed slightly below an upper surface of the mount portion 23. An outer peripheral surface of the upper end of the upper portion 39 of the column 33 accommodated in the through hole 29 is opposed to an inner peripheral surface of the through hole 29 at a predetermined distance from each other.

Tip ends of the thin portions 37 of the rupture portion 31 are connected to the outer peripheral surface of the column 33 which is opposed to the inner peripheral surface of the through hole 29, and the rupture portion 31 is disposed along the circumferential direction. The column 33 can move with respect to the mount portion 23 around the rupture portion 31. That is, the mount portion 23 can be displaced vertically with respect to the column 33 around the rupture portion 31. The upper portion 39 of the column 33 is provided with an abutting portion 42 which abuts against the panel 7 in its retaining state to the panel 7 of the mount portion 23.

As shown in FIG. 4, the abutting portion 42 comprises an annular plate member and projects outward in a circumferential direction from a lower end of an outer peripheral surface of the upper portion 39. The abutting portion 42 is gradually inclined downward from the base end toward the tip end, and a diameter of the tip end is greater than that of the engaging hole 13. The tip end of the abutting portion 42 abuts against the upper surface of the panel 7. When the tip end of the abutting portion 42 abuts against the upper surface of the panel 7, the entire retaining portion 25 is restrained from moving downward.

The engaging blade portions 35 are connected to the lower end of the lower portion 41 of the column 33. The engaging blade portions 35 gradually incline outward from the lower end of the lower portion 41 of the column 33 toward the mount portion 23, and are disposed on either side of the column 33. Each engaging blade portion 35 is resiliently displaced toward the column 33 around the lower end of the lower portion 41. The engaging blade portion 35 is provided at its tip end with an engaging step portion 43 for engaging with the engaging hole 13 of the panel 7.

The engaging step portion 43 is engaged with the opening edge of the engaging hole 13 of the panel 7, and is biased outward by the resilient force of the engaging blade portion

35. The engaged state between the panel 7 and the engaging hole 13 is held. The engaging step portion 43 restrains the entire retaining portion 25 from moving upward in its engaged state with the engaging hole 13.

As shown in FIG. 2A, when the clamp 21 is used, the mount portion 23 is first mounted to a predetermined position of the wire harness 3. Next, the mount portion 23 is retained to the panel 7 by the retaining portion 25.

When the mount portion 23 is mounted to a predetermined position of the wire harness 3, the upper surface of the mount portion 23 is set along the wire harness 3 and in this state, mount portion 23 and the wire harness 3 are wound around the tape winder 19. The mount portion 23 mounted to the wire harness 3 is retained to the panel 7 by the retaining portion 25.

When the mount portion 23 is retained to the panel 7, the engaging blade portion 35 of the retaining portion 25 is previously aligned with the engaging hole 13 of the panel 7 and in this state, the mount portion 23 is moved downward, and the engaging blade portion 35 is pushed into the engaging hole 13 of the panel 7. When the engaging blade portion 35 is pushed into the engaging hole 13 of the panel 7, the outer surface of the engaging blade portion 35 slides the opening edge of the engaging hole 13. The engaging blade portion 35 is displaced toward the column 33 around the lower end of the lower portion 41.

If the engaging blade portion 35 is further pushed into the engaging hole 13 and the engaging step portion 43 is disposed in the engaging hole 13, the engaging step portion 43 is biased outward by the resilient force of the engaging blade portion 35. The engaging step portion 43 is engaged with the opening edge of the engaging hole 13. At that time, the engaging blade portion 35 keeps the engaged state with the engaging hole 13 of the engaging step portion 43 by its own resilient force.

The retaining portion 25 of the clamp 21 is retained to the panel 7. The mount portion 23 is retained to the panel 7 by retaining the retaining portion 25 to the panel 7, and the predetermined position of the wire harness 3 is fixed to the panel 7.

In this state, because the panel 7 of the engaging step portion 43 is engaged with the engaging hole 13, the entire retaining portion 25 is restrained from moving upward. Further, the tip end of the abutting portion 42 abuts against the upper surface of the panel 7, and the entire retaining portion 25 is restrained from moving downward. Therefore, the retaining portion 25 of the clamp 21 is prevented from rattling when force such as inadvertent force is applied, and the retaining portion 25 is reliably retained to the panel 7. Therefore, it is possible to reliably fix the predetermined position of the wire harness 3 to the panel 7.

When the wire harness 3 whose predetermined position is fixed to the panel 7 by the clamp 21 is removed, a portion of the wire harness 3 disposed to one side in the longitudinal direction of the mount portion 23 is pulled upward as shown with an arrow in FIG. 2B.

When the wire harness 3 is pulled upward, one side of the mount portion 23 is pulled upward and displaced in accordance with the tension of the wire harness 3. Therefore, the mount portion 23 is displaced upward around the rupture portion 31, and the other side of the mount portion 23 in the longitudinal direction is displaced downward, and is inclined as a whole. At that time since the retaining portion 25 is reliably retained to the panel 7, the clamp 21 can reliably displace the mount portion 23 around the rupture portion 31. When the mount portion 23 is displaced to a predetermined position, the projecting portion 27 on the other side in the longitudinal direction abuts against an upper surface of the panel 7.

If the wire harness 3 is further pulled upward in this state, the mount portion 23 is caused to turn around the projecting portion 27 which abuts against the upper surface of the panel 7. Thus, the plurality of thin portions 37 of the rupture portion 31 are pulled between the inner peripheral surface of the through hole 29 and the outer peripheral surface of the column 33, and ruptured by using leverage.

In a state in which all of the plurality of thin portions 37 of the rupture portion 31 are ruptured, as shown in FIG. 2C, the mount portion 23 and the retaining portion 25 are separated, the retaining state of the mount portion 23 to the panel 7 is released and the mount portion 23 is brought into a free state. Thus, the fixation of the wire harness 3 to the panel 7 by the clamp 21 is released. If the wire harness 3 is pulled upward as shown with an arrow in FIG. 2C, the wire harness 3 can be removed from the panel 7 together with the mount portion 23.

In the clamp 21 of this embodiment, in the state in which the wire harness 3 is fixed to the panel 7, if the portion of the wire harness 3 disposed on one side of the mount portion 23 in the longitudinal direction is pulled upward to displace the mount portion 23, the rupture portion 31 is ruptured. The fixation of the wire harness 3 to the panel 7 is released, and the wire harness 3 can easily be removed from the panel 7.

In the clamp 21, the rupture portion 31 is formed of the plurality of thin portions 37 provided along the circumferential direction. When inadvertent force is applied to the wire harness 3 in the fixed state of the wire harness 3 to the panel 7, the inadvertent force is dispersed to the thin portions 37 of the rupture portion 31, and it is possible to prevent the rupture portion 31 from being ruptured. Thus, in the clamp 21, it is possible to reliably fix the wire harness 3 to the panel 7.

In the clamp 21, when the rupture portion 31 is ruptured, the mount portion 23 is displaced around the projecting portion 27 which abuts against the upper surface of the panel 7. The plurality of thin portions 37 of the rupture portion 31 can be pulled between the through hole 29 and the column 33 by using leverage caused by displacement of the mount portion 23. As a result, in the clamp 21, it is possible to easily rupture the rupture portion 31 and to remove the wire harness 3 from the panel 7.

In the clamp 21, the rupture portion 31 is provided along the circumferential direction of the upper portion 39 of the column 33. Thus, in a state in which the wire harness 3 is fixed to the panel 7, the inadvertent force applied to the wire harness 3 can be dispersed more reliably. Therefore, it is possible to fix the wire harness 3 to the panel 7 more reliably.

In the clamp 21, the upper end of the upper portion 39 of the column 33 is accommodated in the through hole 29 of the mount portion 23. Therefore, the clamp 21 can be reduced in size in correspondence with the amount of the upper portion 39 accommodated in the through hole 29.

In the clamp 21 of the embodiment, in addition to the engagement of the panel 7 of the engaging step portion 43 with the engaging hole 13, the tip end of the abutting portion 42 abuts against the upper surface of the panel 7, and the retaining portion 25 is reliably retained to the panel 7. Therefore, it is possible to fix, at a predetermined position, the wire harness 3 to the panel 7 more reliably.

Although the rupture portion 31 is formed of the plurality of thin portions 37 in the clamp 21 of this embodiment, the rupture portion 31 may be formed of a continuous annular thin portion.

In the clamp 21, the inner peripheral surface of the through hole 29 provided in the mount portion 23 and the outer peripheral surface of the upper portion 39 of the column 33 are connected to each other by the rupture portion 31. Instead, the through hole 29 of the mount portion 23 may be omitted, and the lower surface of the mount portion 23 and the column 33 may be connected by means of the rupture portion 31.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

As explained above, according to the first aspect of the present invention, if a rupture portion is ruptured in a state in which the electric wire is fixed to the mating mount portion, the fixed state of the electric wire to the mating mount portion can be released and thus the electric wire can be easily removed from the mating mount portion. Since the rupture portion is provided on the column in a circumferential direction, when inadvertent force is applied to the electric wire in a state in which the electric wire is fixed to the mating mount portion, the inadvertent force is dispersed to the entire region of the rupture portion, and it is possible to prevent the rupture portion from being ruptured. As a result, the electric wire can be reliably fixed to the mating mount portion.

According to the second aspect of the invention, in addition to the effect of the first aspect, the rupture portion of the column is formed of a plurality of thin portions provided along the circumferential direction. Thus, the rupture portion can be ruptured more easily. Therefore, it is possible to remove the electric wire from the mating mount portion more easily in a state in which the electric wire is fixed to the mating mount portion.

According to the third aspect of the invention, in addition to the effect of the first aspect, the base end side of the column is formed into a columnar shape. Therefore, it is possible to more reliably disperse the inadvertent force applied to the electric wire in the fixed state of the electric wire to the mating mount portion. Thus, the electric wire can be fixed to the mating mount portion more reliably.

According to the fourth aspect of the invention, in addition to the effect of the first aspect, the abutting portion abuts against the mating mount portion in addition to the engagement between the engaging blade portion and the engaging hole. Therefore, the rupture portion is retained to the mating mount portion reliably, and the electric wire can be fixed to the mating mount portion at a predetermined position more reliably.

According to the fifth aspect of the invention, in addition to the effect of the fourth aspect, the abutting portion is formed into the annular plate member and thus, the inadvertent force applied to the column can be dispersed more reliably in a state in which the electric wire is fixed to the mating mount portion. Thus, the electric wire can be reliably fixed to the mating mount portion.

According to the sixth aspect of the invention, in addition to the effect of the first aspect, the end of the mount portion in the longitudinal direction is provided with the projecting portion. With this, when the electric wire is removed from the mating connector, if the mount portion is turned around the projecting portion, the rupture portion can be ruptured easily. Thus, the electric wire can be removed from the mating mount portion more easily in a state in which the electric wire is fixed to the mating mount portion.

According to the seventh aspect of the invention, in addition to the effect of the first aspect, since the base end side of the column is accommodated in the through hole of the mount portion, the clamp can be reduced in size correspondingly.

According to the eighth aspect of the invention, in addition to the effect of the first aspect, since the engaging step portion which engages with the opening edge is provided, the engaging blade portion is engaged with the opening reliably. Therefore, the electric wire can be fixed to the mating mount portion reliably.

What is claimed is:

1. A clamp, comprising:
    a mount portion to be mounted to an electric wire; and
    a retaining portion for retaining the mount portion to a mating mount portion,
        the retaining portion, comprising:
            a rupture portion which can be ruptured;
            a column having a base end side connected to the mount portion through the rupture portion; and
            an engaging blade portion provided on a tip end of the column and engaged with an opening of the mating mount portion,
    wherein the rupture portion is provided along a circumferential direction of the column.

2. A clamp according to claim 1,
    wherein the rupture portion is formed by a plurality of thin portions, having predetermined pitches from one another.

3. A clamp according to claim 1,
    wherein the base end side of the column is formed into a columnar shape.

4. A clamp according to claim 1, further comprising;
    an abutting portion provided on the column,
    wherein the abutting portion abuts against the mating mount portion in a state in which the mount portion is engaged with the mating mount portion.

5. A clamp according to claim 4,
    wherein the abutting portion is formed by an annular plate member, and projected outward in the circumferential direction of the column.

6. A clamp according to claim 1, further comprising;
    a projecting portion provided at end of the mounting portion in longitudinal direction.

7. A clamp according to claim 1, further comprising:
    a through hole provided on the mount portion,
    wherein the base end side is accommodated in the through hole.

8. A clamp according to claim 1, further comprising;
    an engaging step portion provided at a tip end of the engaging blade portion,
    wherein the engaging step is engaged with an opening edge of the opening.

* * * * *

UNITED STATES PATENT AND TRADEMARK OFFICE
CERTIFICATE OF CORRECTION

PATENT NO.   : 6,827,316 B1
DATED        : December 7, 2004
INVENTOR(S)  : Hiroaki Arai It is certified that error appears in the above-identified patent and that said Letters Patent is hereby corrected as shown below:

<u>Title page,</u>
Item [86], PCT No., "Dec. 6, 2003" should read -- Dec. 4, 2003 --.

Signed and Sealed this

Twenty-fourth Day of May, 2005

JON W. DUDAS
*Director of the United States Patent and Trademark Office*